United States Patent [19]

Dunn et al.

[11] Patent Number: 4,576,541

[45] Date of Patent: Mar. 18, 1986

[54] SAFETY LATCH FOR A CARGO PLATFORM

[75] Inventors: Jeffery L. Dunn, Covington, Ky.; Michael W. Durham, Milford, Ohio

[73] Assignee: Leyman Manufacturing Corp., Cincinnati, Ohio

[21] Appl. No.: 584,595

[22] Filed: Feb. 29, 1984

[51] Int. Cl.⁴ .............................................. B60P 1/46
[52] U.S. Cl. ..................................... 414/545; 292/122
[58] Field of Search ................................ 414/539–541, 414/545, 546, 557, 786; 187/9 R; 292/122, 125, 133, 220, 225, 235; 298/23 A, 23 F

[56] References Cited

U.S. PATENT DOCUMENTS

| | | | |
|---|---|---|---|
| Re. 31,157 | 2/1983 | Perkins | 414/545 |
| 2,706,565 | 4/1955 | Krasno | 414/545 |
| 3,024,926 | 3/1962 | Nolden | 414/545 |
| 3,172,280 | 3/1965 | Cohen | 70/100 |
| 3,211,307 | 10/1965 | Neaverson et al. | 414/539 |
| 3,275,170 | 9/1966 | MacRae et al. | 414/545 |
| 3,282,449 | 11/1966 | Buford | 414/540 |
| 3,734,239 | 5/1973 | Martin et al. | 187/9 R |
| 3,752,336 | 8/1973 | Blount | 414/545 |
| 3,968,890 | 7/1976 | Robson | 414/545 X |
| 4,007,844 | 2/1977 | Perkins | 414/545 X |
| 4,087,007 | 5/1978 | Drews | 414/545 |
| 4,113,121 | 9/1978 | Collins et al. | 414/545 |
| 4,198,188 | 4/1980 | Perkins | 414/545 |
| 4,540,329 | 9/1985 | Martin | 414/540 X |

Primary Examiner—Robert J. Spar
Assistant Examiner—David A. Bucci
Attorney, Agent, or Firm—Wood, Herron & Evans

[57] ABSTRACT

A safety latch for a cargo platform of the type particularly adapted to be mounted on the rear of a truck's cargo body. The cargo platform is pivotally mounted along its front edge to a combined elevating/storing mechanism which is of a chain and compounding sprocket type. In this type mechanism, the chain is taut as it holds the cargo platform in horizontal position when it functions as an elevator, and the chain is taut as it is compounded when it is desired to open and close the cargo platform between vertical storage and horizontal elevator positions. The safety latch cooperates with the cargo body, the chain, and the platform to insure that the platform is latched to the cargo body in its storage position when the chain is slack, i.e., not taut. The chain is always taut when the cargo platform is in the horizontal position and used as an elevator, as well as when the cargo platform is being swung between its elevator position and its vertical position. However, in the final vertical storage position the chain may go slack, and it is when that slackness occurs that the safety latch automatically interconnects with the platform and the cargo body to insure that the platform is retained in the vertical position.

13 Claims, 8 Drawing Figures

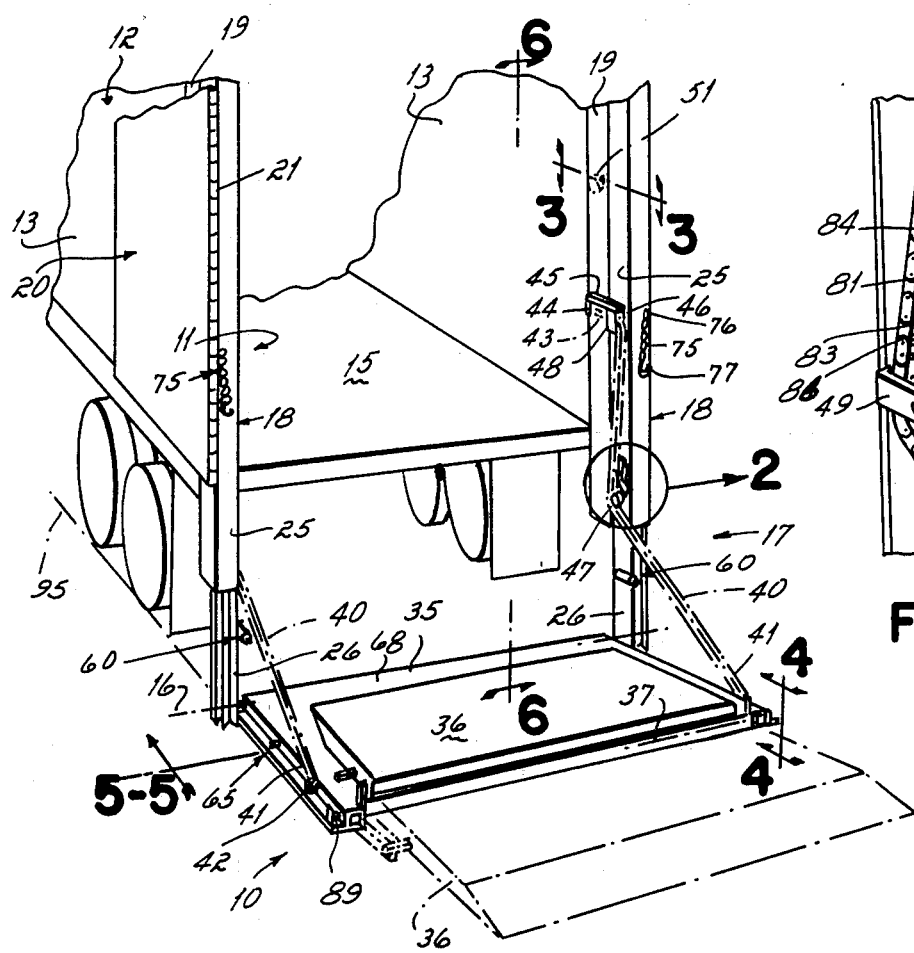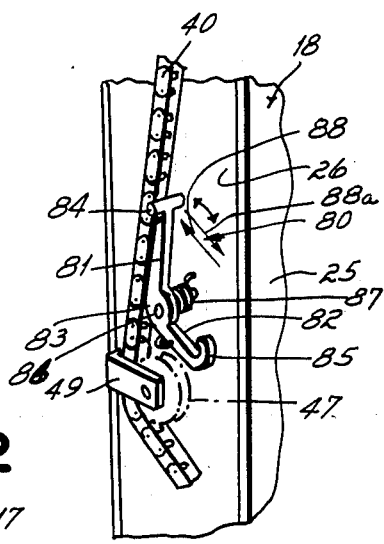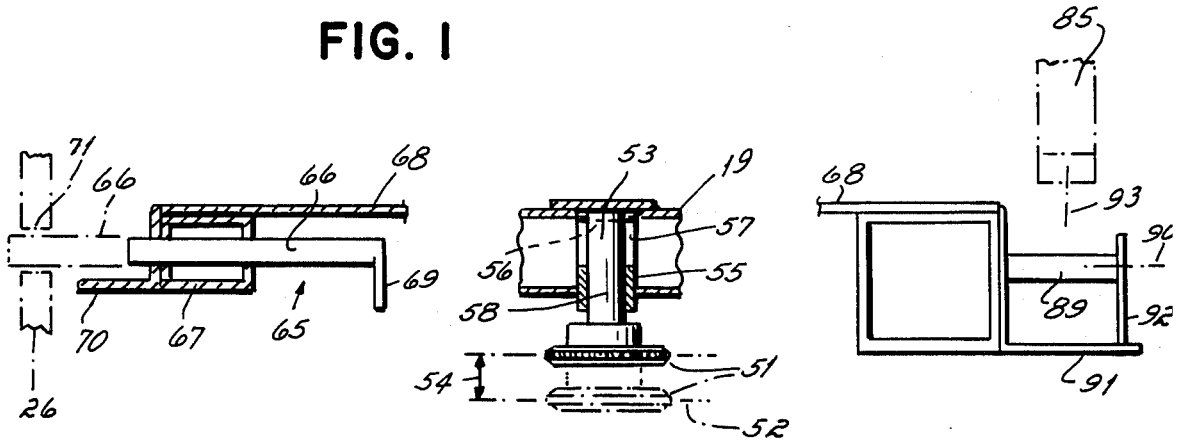
FIG. 1
FIG. 2
FIG. 5
FIG. 3
FIG. 4

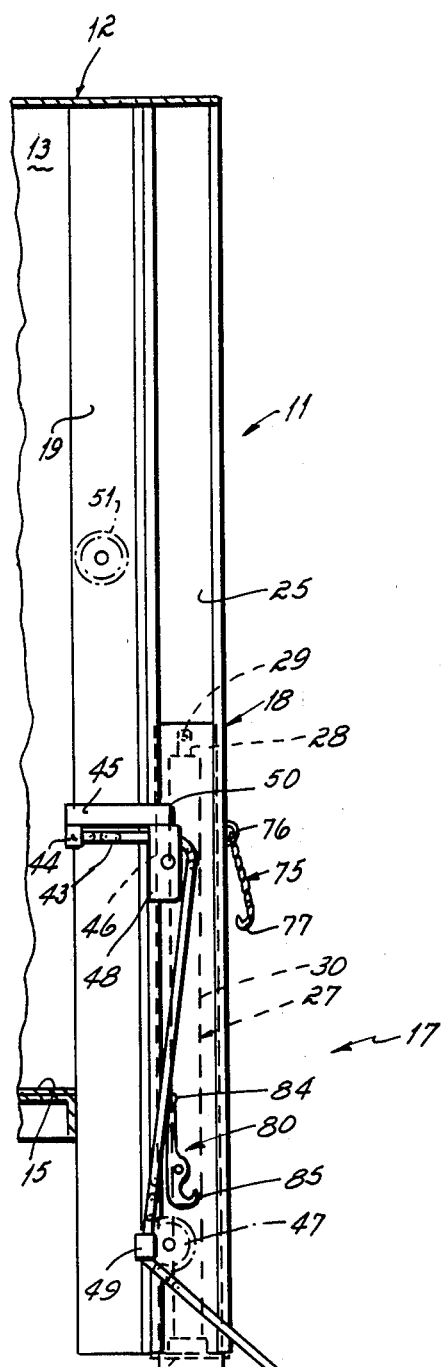
FIG. 6
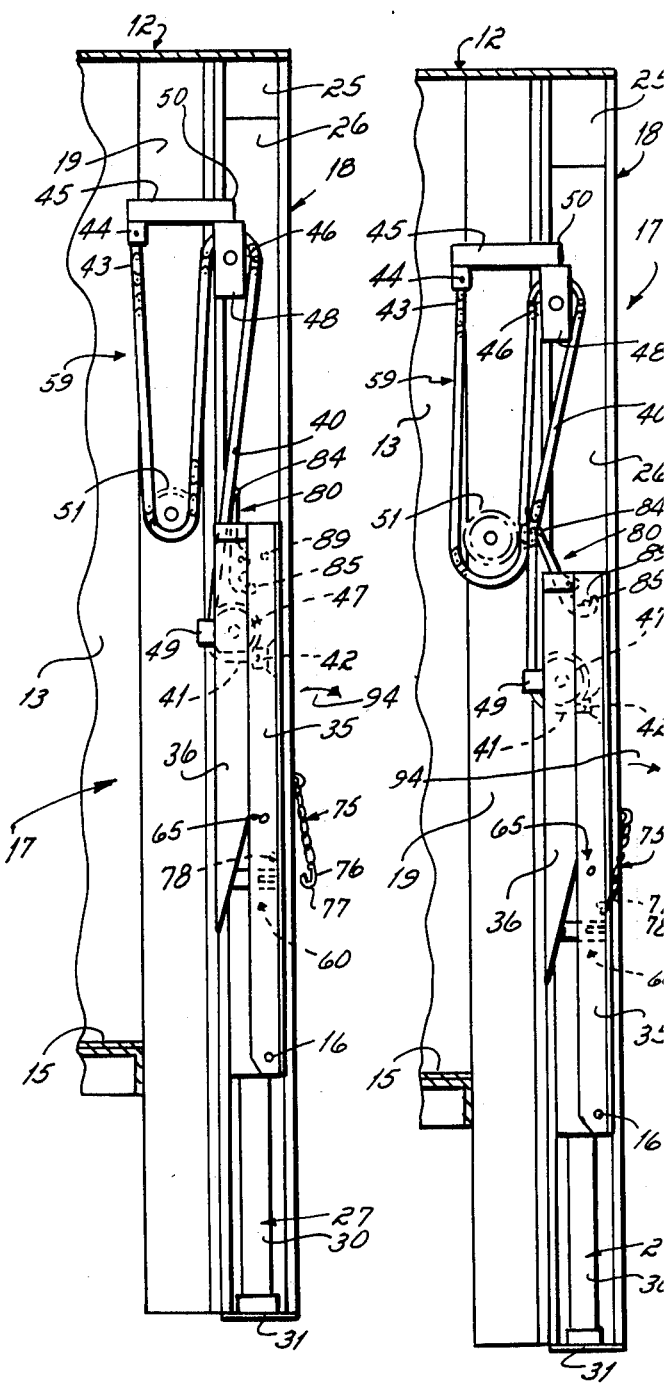
FIG. 7
FIG. 8

SAFETY LATCH FOR A CARGO PLATFORM

This invention relates to cargo platforms. More particularly, this invention relates to a safety latch for a cargo platform.

Cargo platforms that are operable as elevators, and that are storable somewhere about a truck's cargo body so as to be movable with the truck, are well known in the prior art. Generally, such cargo platforms are mounted in combination with a special elevating and storing mechanism that is supported by, i.e., fixed to, the sides and/or bed of the truck's cargo body. One common type of cargo platform functions as an elevator, and also functions as a closure in the form of a gate for the truck's cargo area when stored. During use on a truck, this type of cargo platform is movable between its over-the-road storage position where the platform is vertically disposed in gate-like fashion relative to the bed of the truck body so it at least partially closes off the access opening of the cargo body, and its horizontal or open or elevator position where the storage area of the cargo body is readily accessible for ingress and egress. Once in the horizontal position, the platform may be moved up and down between the bed or floor of the cargo body, and ground level or a loading dock, for quick, efficient loading and unloading of the truck's cargo space. Particularly useful types of such cargo platforms are illustrated in U.S. Pat. Nos. 3,371,805 and 3,804,276 to W. H. Himes, and in U.S. Pat. No. 4,087,007 to R. E. Drews, all assigned to the assignee of this application.

The cargo platforms disclosed in the above noted patents, in commercial practice, cooperate with a combined elevating and storing mechanism that itself is unique. This mechanism is of a chain and compounding sprocket type, the chain being fixed at one end to the cargo body and at the other end to the platform. A compounding sprocket is movable, into and out of compounding relationship with the chain. The compounding sprocket is removed from compounding position with the chain when the cargo platform is in the horizontal position so it can move up and down as an elevator, and is placed in compounding position with the chain when it is desired to open or close the platform relative to its vertical over-the-road storage position. Accordingly, and when the cargo platform is in the over-the-road storage position, the sprocket normally is in compounding position with the chain. Also, manually operable safety bolt is used by which the cargo platform is retained in the vertical position relative to the ground when it is in the vertical storage position. This, of course, insures that the platform will not inadvertently fall or swing down toward its horizontal elevator position while the truck moves over-the-road. But the cargo platform is slightly lowered from its full up position before the truck moves over-the-road so that it is held in its storage position above ground by means of a manually connected safety chain fixed at one end to the truck's body. When the cargo platform is so lowered, the compounding chain goes slightly slack. And on occasion this permits the compounding sprocket to work its way out of compounding relation with the chain as the truck moves over-the-road. When the truck reaches its destination, and with the safety bolt and safety chain removed from interconnect positions, the cargo platform theoretically will be swung down into horizontal elevator position when the combined elevating/storing mechanism is activated by an operator. But if the sprocket has moved out of compounding relationship with the chain, the platform does not swing down as it should as it is lowered toward ground. This results in a potential safety hazard to the operator in that there is nothing to prevent the platform from falling or swinging down quickly, uncontrollably, and without notice when the compounding sprocket is not engaged with the compounding chain. And this, of course, could pose a safety hazard to the operator.

Accordingly, it has been one objective of this invention to provide a novel safety latch for a cargo platform of that type that swings between a horizontal elevator position and a vertical storage position, the safety latch functioning to prevent the cargo platform from swinging down to the horizontal position from its vertical storage position until and unless the mechanism that controls and effects the open swinging motion is properly engaged in order to prevent inadvertent and uncontrolled downward swinging motion of the platform as the platform commences movement from its storage position to its elevator position.

It has been another objective of this invention to provide a safety latch for a cargo platform of the type movable between a vertical storage position and a horizontal elevator position, the mechanism for opening and closing that platform being of a compounding chain and sprocket type, tautness of the chain preventing cooperation of the latch with the cargo platform when the platform is in the vertical position, but slackness in the chain permitting activation and cooperation of the latch with the cargo platform to restrain the platform when the platform is in its storage position.

In accord with these objectives, the safety latch of this invention is particularly adapted for use with a cargo platform of the type that is mountable on the rear of a truck's cargo body. The cargo platform is pivotally mounted along its front edge to a combined elevating/storing mechanism which, preferably, is of a chain and compounding sprocket type. In this type mechanism, the chain is taut as it holds the cargo platform in horizontal position when it functions as an elevator, and the chain is taut as it is compounded when it is desired to open and close the cargo platform between vertical storage and horizontal elevator positions. The safety latch cooperates with the cargo body, the chain, and the platform to insure that the platform is latched to the cargo body in its storage position when the chain is slack, i.e., not taut. The chain is always taut when the cargo platform is in the horizontal position and used as an elevator, as well as when the cargo platform is being swung between its elevator position and its vertical position. However, in the final vertical storage position the chain may go slack, and it is when that slackness occurs that the safety latch automatically interconnects with the platform and the cargo body to insure that the platform is retained in the vertical position.

Other objectives and advantages of the invention will be more apparent from the following detailed description taken in conjunction with the drawings in which:

FIG. 1 is a perspective view illustrating a cargo platform in combination with an elevating/storing mechanism, the platform being disposed at ground level in an elevator attitude;

FIG. 2 is an enlarged perspective view of that area encircled in FIG. 1;

FIG. 3 is a cross-sectional view taken along line 3—3 of FIG. 1;

FIG. 4 is a cross-sectional view taken along line 4—4 of FIG. 1;

FIG. 5 is a cross-sectional view taken along line 5—5 of FIG. 1;

FIG. 6 is a cross-sectional view taken along line 6—6 of FIG. 1;

FIG. 7 is a view similar to FIG. 6 but illustrating the cargo platform in the full up vertical position; and FIG. 8 is a view similar to FIG. 7 illustrating the platform in the relaxed over-the-road vertical storage position.

A cargo platform 10 is suitably located at the rear or access opening 11 of a cargo body 12, e.g., a trailer or truck body, having side walls 13, a top wall (not shown), and a bed or floor 15, see FIG. 1. The cargo platform 10 is pivotally connected on horizontal pivot axis 16 to an elevating and storing mechanism 17 that includes two mast assemblies 18. Each mast assembly 18 is fixed or secured to a rear corner post 19 of the cargo body 12 at the rear vertical corner edges thereof. Suitable rear doors 20 may be mounted on hinges 21 to the corner edges of each of the mast assemblies 18, the doors being pivotable between a completely open position whereat they are flush against the cargo body's side walls as shown in FIG. 1, and a completely closed position where they cover the entire rear access opening 11 of the cargo body. In the door 20 closed position, and with the cargo platform 10 stored vertically in either the over-the-road storage position shown in FIG. 8, the platform, the elevating and storing mechanism 17, and the interior of the truck body 12, are closed to the environment, e.g., weather conditions, surrounding the truck body.

Each mast assembly 18 includes a vertical C-shaped channel or mast guide 25 mounted to its associated corner post 19, see FIGS. 1 and 6-8. Each mast guide 25 is mounted so that its open side faces the other mast guide across the rear access opening 11 of the cargo body 12. A slide bar or mast 26 is received within each mast guide 25 for vertical sliding movement therein. Each mast 26 is guided in its vertical sliding movement by its mast guide 25, and the platform 10 is pivotally connected on axis 16 by pins at the bottom ends of opposed mast.

Each mast 26 and mast guide 25 is also connected by mast lifting means 27 to selectively raise and lower the mast in its mast guide, see FIGS. 6-8. The mast lifting means may be either mechanical, hydraulic or pneumatic means, such as a linear fluid motor 27 which is disposed within the interior of each of the mast assemblies 18. Each motor 27 includes a ram 28 which is coupled to mast 26, as at 29, and a cylinder 30 which is coupled to mast guide 25, i.e., to the cargo body 12, as at 31. Each fluid motor 27 is actuated by pressurized fluid supplied by a pump or hydraulic power pack, not shown, mounted within a storage box, not shown, carried beneath the floor or bed 15 of the cargo body 12 at a position centrally located of that body. The hydraulic power pack may be electrically controlled from equipment stored in a control box, not shown. The control box, not shown, may store a flexible electrical conduit and controller, not shown, to permit the cargo platform's operator to stand and control operation of the cargo platform 10 at a position remote from the platform. This mast assembly mechanism is more particularly set forth in one or more of the Himes and Drews U.S. patents previously referred to, the disclosures of which are incorporated herein by reference.

The cargo platform 10 basically includes a front section 35 and a rear section 36; that is, the cargo platform is articulated into two half sections 35, 36 with these sections being hinged together at a pivotal joint along a second hinge axis 37 parallel to hinge axis 16 for the platform. The platform's front section 35 is pivotally mounted on first pivot axis 16, as mentioned, between the two mast assemblies 18 so that the whole platform may pivot between a storage position whereat it is disposed vertically above the bed 15 of the truck body 12 and at least partially closes the rear opening of the body, see FIG. 8, and an elevator position whereat it extends horizontally and rearwardly of the truck body, see FIGS. 1 and 6.

When it is open, the cargo platform 10 is maintained in a horizontal position by means of flexible tension means 40 such as, e.g., chains, belts or wires, on each side of the platform, each of which cooperates with one mast assembly. Each chain 40, which preferably is in the form of a roller chain, is permanently secured at its outer end 41 as at 42 to the cargo platform's front section 35. And each chain 40 is connected at its inner end 43 as at 44 to finger 45, the finger extending substantially beyond, yet being fixed as at 50 to, its associated mast 26 intermediate the ends of the mast. Each mast 26 also mounts a first freely rotating idler sprocket 46 adjacent the finger 45, and a second fully rotating idler sprocket 47 mounted in position intermediate the finger 45 and the bottom of the mast, see FIGS. 1 and 6. Guides 48, 49, fixed to the mast 26, cooperate with each idler sprocket 46, 47, respectively, to retain the chain in meshed engagement therewith, see FIG. 4. Note, therefore, that each chain 40 proceeds from its pinned end 41 at the platform 10 under the idler sprocket 47, and up over the idler sprocket 46 to its other pinned end 43 fixed to finger 45 on mast 26.

Each finger 45 extends forward of its associated mast guide 25 (even though it is fixed to a mast 26) to be able to present the roller chain 40 for engagement with a selectively positionable compounding sprocket 51, see FIGS. 1, 3 and 6-8. The freely rotatable compounding wheel or sprocket 51 is mounted on adjacent rear corner post 19, and is selectively positionable between an in position illustrated in solid lines in FIG. 3 and an out position illustrated in phantom lines in FIG. 3 relative to the plane 52 of the chain 40, i.e., relative to that corner post. The compounding sprocket 51 is mounted on one end of a shaft 53 which is secured for limited axial movement in direction 54 within a sleeve 55, the sleeve being rigidly secured to the corner post 19. The other end of the shaft 53 radially mounts a pin 56 which has its ends captured in a pair of axial slots 57 formed in the sleeve to limit the sprocket's inner and outer positions. In the compound position, and as is illustrated in phantom lines in FIG. 3, the compounding sprocket 51 is disposed in the plane 52 of the chain 40, that chain plane 52 remaining constant, i.e., immobile, in light of the fixed end points 42, 44 of the chain and the fixed locations of first 46 and second 47 idler sprockets. Thus, the compounding sprocket 51 is always in connected assembly with the combined elevating and closing mechanism 17, i.e., the compounding sprocket does not have to be removed from operational assembly therewith at any time to move same between compounding and noncompounding positions. Further, the compounding sprocket 51 is axially movable along its rotational axis 58 between its operative and inoperative positions.

When the cargo platform is to be operated in elevator like fashion, each compounding sprocket 51 is moved to the non-compound position shown in solid lines in FIG. 3, thereby removing the compounding sprocket from compounding position with chains. As the masts 26 are moved upwardly or downwardly relative to the mast guides 25 by fluid motors 27, the compounding sprockets 51 remain out of compounding position and do not engage the chains 40. Thus, the cargo platform 10 operates in elevator fashion. On the other hand, and when it is desired to move or swing the cargo platform 10 into a vertical attitude from its horizontal or open attitude, the compounding sprockets 51 are simply extended to the compounding position shown in phantom lines in FIG. 3 so as to present the compounding sprockets in the vertical planes 52 of the chains 40. This permits the chains to be compounded or doubled, see FIGS. 7 and 8, as the masts 26 move upwardly within the mast guides 25 to vertically orient the cargo platform 10. When it is desired to swing the stored platform 10 from the vertical, FIG. 8, storage position to the horizontal FIG. 6 elevator position, the masts 26 are simply lowered within the mast guides 25 so that the compounded or doubled loops 59 in the chains are gradually reduced and then eliminated so the platform swings open.

A spring loaded plunger 60 is also mounted to each mast 26. Each spring loaded plunger 60 is in the nature of a sleeve 61 fixed to the mast, same having a T-shaped plunger head 62 (not shown in detail) spring loaded outwardly by a spring (not shown) constrained within the sleeve. The spring loaded plungers 60 are arranged so as to cooperate with the edges of the cargo platform's front section 35. Thus, the spring loaded plungers function to apply constantly an opening or pivoting force moment 63 to the cargo platform 10 when same is in the vertical storage attitude illustrated in FIG. 8. This spring loaded opening or pivoting force moment 63 is nullified in the vertical storage attitude of FIG. 8 by interaction of safety bolts 65 with the masts 26 as described in detail below.

A safety bolt 65 is carried on each side of the cargo platform 10, see FIGS. 1 and 5. Each safety bolt, as illustrated in FIG. 5, is comprised of a rod 66 carried in collar 67 fixed to the underside of the platform's floor 68. The rod 66 is provided with a handle 69 on the inner end thereof, and is extendable outwardly beyond the side edge 70 of the platform 10. Each safety bolt 65 is slidable between a home or storage position illustrated in solid lines in FIG. 5, and an extended or interconnect position illustrated in phantom lines in FIG. 5. The safety bolt 65 on each side of the platform 10 is adapted to function operationally with hole 71 in the mast 26 associated with that side of the platform. The center line of the mast hole 71 is the same distance from the first pivot axis 16 as the center line of the safety rod 66 is from that first pivot axis, all as illustrated in FIG. 6. When the cargo platform is in its vertically full up position, or in its storage position, as illustrated in FIGS. 7 and 8, respectively, the safety bolts 65 on each side of the platform 10 are moved into the extended position shown in phantom lines in FIG. 5, thereby interconnecting the cargo platform with the respective side masts 26. Thus, the safety bolts 65 insure that the cargo platform 10 is connected with the masts 26, i.e., is made non-pivotable relative to the masts, when those bolts are fully extended and received into bolt holes 71 in the masts. And this prevents the cargo platform 10 from inadvertently and uncontrollably swinging or falling out of its vertical position as the truck moves over-the road.

Safety chains 75 also are provided on the truck body 12 at each side of the platform 10 to cooperate with the combined elevating and closing mechanism 17. Each safety chain 75 is permanently connected as at 76 to a mast guide 25. The free end of the safety chain 75 is provided with a hook 77 adapted to cooperate with pin 78 fixed to the understructure of the cargo platform 10, see FIGS. 7 and 8. The hook 77 of the safety chain 75 is interconnected with the platform's pin 78 when the platform is in the over-the-road storage attitude as illustrated in FIG. 8. With the platform 10 hooked by chains 75 in this manner, the pressure in fluid motors 27 may be relieved, thus relaxing the tension on compounding chains 40 so that safety chains 75 will carry the weight of the platform as to the truck body travels over the road.

A safety latch 80 in accord with the principles of this invention is particularly illustrated in FIGS. 1, 2, and 4, and its operation is illustrated in FIGS. 7 and 8. A safety latch 80 is mounted on each mast 26, and only functions in operative engagement with the cargo platform 10 when the platform is in the vertical storage position, and when the compounding chain 40 is slack, i.e., not taut, all as shown in FIG. 8 and described in greater detail below. More specifically, the safety latch 80 has a generally bell crank or right angular configuration with a sensor arm 81 and a hook arm 82 joined at elbow 83. The sensor arm 81 includes a cam pin 84 at its free end, and the hook arm 82 includes a hook 85 at its free end. The latch 80 is pivotally mounted at elbow 83 on pin 86 to its associated mast 26, the latch being adapted thereby to pivot in a plane parallel to the plane 52 of compounding chain 40. A coil spring 87 provides a constant rotational bias to the latch 80 so that the sensor arm 81 of the latch is continuously biased in direction shown by phantom arrow 88 against the compounding chain 40. The coil spring 87 is a torsion spring with one end fixed to the mast and the other end fixed to the latch arm at connection points not shown. A safety latch 80 of the character described is provided on each mast 26, each of the safety latches being pivotally connected thereto between the first 46 and second 47 idler sprockets. Note particularly that the safety latch's sensor pin 84 is positioned to move in the vertical plane 52 of the compounding chain 40 that it serves.

The cargo platform 10 includes a latch pin 89 on each side thereof that cooperates with each safety latch 80. The latch pins 89, one of which is shown in greater detail in FIG. 4, are each on an axis 90 parallel to the hinge axis 16 of the platform with its masts 26, which axis 90 is normal to the plane 52 of compounding chain 40. Each pin 89 is fixed to the platform 10 through use of an angle element 91 and bracket 92. Note particularly, as shown in FIG. 4, that each pin 89 is in the same vertical plane 93 as its associated safety latch's hook 85, which plane 93 is offset from but parallel to the compounding chain's plane 52.

In operation, the normal over-the-road storage attitude of the cargo platform 10 is as illustrated in FIG. 8. As shown in that figure, the platform 10 is vertically oriented in a storage position at which it closes a portion of the rear opening 11 of the cargo body 12 (that rear opening being fully closed by doors 20 when the doors themselves are closed over the platform). In this attitude, the safety bolts 65 are extended so as to interconnect the folded cargo platform 10 with the masts 26 of the combined elevating/closing mechanism 17, thereby preventing the cargo platform from bearing against the doors, i.e., from swinging or pivoting about pivot axis 16 toward the open position, as so urged spring loaded plungers 60. Also in this storage attitude, the compounding sprockets 51 are extended linearly relative to their rotational axes 58 into the plane 52 of the compounding chains 40, thereby causing each chain to be compounded into two loops 59 as illustrated in FIG. 8 so as to draw the folded platform 10 up into the over-the-road storage attitude in response to raising of the platform by the hydraulic motors 27. Also in the over-the-road storage attitude, the safety chains 75 on cargo body 12 are interconnected with the pins 78 on the platform 10. And with the safety chains 75 so connected with the vertically oriented cargo platform 10, the pressure within fluid motors 27 may be relieved, thereby relaxing the tension on compounding chains 40 so that the safety chains carry the weight of the platform as the truck body 12 travels over-the-road, i.e., so that fluid pressure does not have to be maintained within the fluid system (not shown) connected with fluid motors 27 to hold the cargo platform in its storage position.

With this relief in the fluid motor 27 pressure, the vertically folded platform tends to drop down slightly from its full uppermost position shown in FIG. 7 to the compounding chain 40 relaxed over-the-road position shown in FIG. 8. And it is in this FIG. 8 position that the safety latch 80 of this invention functions and cooperates with the cargo platform. In the FIG. 8 position of the cargo platform 10, and without the safety latch 80, it is possible that the compounding sprockets 51 might move out of compounding relation with the compounding chains 40 (either accidently so moved by an operator, or inadvertently so moved due to vibration from over-the-road travel). And if the cargo platform safety bolts 65 have not been engaged with the masts 26, it is possible for the cargo platform 10 to swing on axis 16 toward its horizontal or elevator open position without any control, thereby posing a potential safety hazard.

The safety latch 80 of this invention functions to prevent this potential safety hazard in that each safety latch's hook 85 engages the associated platform's pin 89 when the cargo platform 10 is translated from the full up FIG. 7 position to the relaxed over-the-road FIG. 8 position, i.e., when fluid pressure is relieved on fluid motors 27. Note particularly as shown in FIG. 7 that with the compounding chains 40 taut, each chain engages a sensor arm 81 of the safety latch 80 and biases that arm in direction 88a against the counter bias of torsion spring 87 so as to insure that the latch's hook 85 does not interfere with the platform 10. However, after safety chains 75 are connected with the cargo platform's pins 78, and after fluid pressure in the fluid motors 27 is relieved as previously mentioned, the platform tends to drop down slightly and is thereafter supported by the safety chains (compare FIG. 8 to FIG. 7). And as the platform drops down, the compounding chains 40 relax. This, in turn, causes each safety latch 80 to pivot on its pin 86 in direction 88 as so biased by the torsion spring 87, thereby orienting the safety latch's hook 85 beneath the cargo platform's pin 89. Once in the FIG. 8 position, therefore, the safety latch 80 prevents the platform 10 from swinging in direction shown by arrow 94 toward ground 95 on its main hinge axis 16. Thus, the safety latch 80 in accord with the principles of this invention functions automatically after the cargo platform 10 is placed in the over-the-road storage posture, and when the compounding chain is relaxed, so as to prevent platform swinging movement from the vertical storage position to the horizontal use position. This feature is particularly useful when it is desired to re-open the cargo platform 10, i.e., when the masts 26 are lowered relative to the mast guides 25 with cargo platform vertical and when and if the compounding sprockets 51 are not in compounding relation with the compounding chain 40.

When it is desired to make use of the cargo platform 10 as an elevator, i.e., to reposition the platform from the storage attitude into the horizontal elevator configuration illustrated in FIG. 6, the safety bolts 65 are first withdrawn from interconnection with the masts 26 to the retraction position illustrated in solid lines in FIG. 5 while the folded cargo platform 10 remains in the storage attitude, and after it has been raised to the full up, FIG. 7, position from the relaxed, FIG. 8, position. Also, the safety chains 75 are removed from engagement with the platform 10 when the platform is raised to the full up, FIG. 7, position from the relaxed FIG. 8, position. If the compounding sprockets 51 are both properly aligned with the compounding chains 40, and as the platform 10 is raised slightly from its FIG. 8 position to the FIG. 7 position, the compounding chains go taut once again to bias the safety latch 80 out of contact with the platform's pins 89 so the platform can be lowered. If one or both of the compounding sprockets 51 are not aligned with the compounding chains 40, the safety latch(es) 80 remains connected with the platform's pin(s) 89 because of the bias on that latch(es) induced by spring(s) 87. Of course, if this latter situation is the case, than the platform 10 must be temporarily lowered back to its FIG. 8 position to relax the chain(s) 40 so the compounding sprockets 51 can be properly oriented therewith.

Assuming the compounding sprockets 51 and chains 40 are properly aligned, and after the cargo platform 10 has been raised slightly which results in disengagement of the safety latches 80, the fluid motors 27 within the mast assemblies 18 are activated so as to lower the platform toward ground 95 level as illustrated in FIG. 6. As the cargo platform 10 is lowered, because the compounding sprockets 51 are within the planes 52 of chains 40, and in response to spring loaded plungers 60 which tend initially to pivot the platform counterclockwise as shown in the figures about its pivot axis 16, the platform is initially pushed and then swings by gravity toward the horizontal attitude as it is lowered to ground level under control of the sprockets and chains. When at ground level, the platform section 36 is pivoted relative to platform section 35 from its sandwich configuration into its horizontal or elevator attitude, thereby positioning the cargo platform in the horizontal or elevator attitude illustrated in phantom lines in FIG. 1. In this elevator attitude, and with the compounding sprockets 51 pushed into the non-compounding or solid line position as illustrated in FIGS. 3 and 6, the cargo platform 10 can be raised and lowered in elevator fashion in response to the motors 27 within the opposed mast assemblies 18 without the chains 40 being compounded, thereby permitting the platform to be raised and lowered in elevator fashion between ground 95 level as illustrated in FIG. 6 and truck bed 15 level (not shown).

When it is desired to return the cargo platform 10 into the FIG. 8 storage or over-the-road attitude, the platform is lowered to ground 95 level and the compounding sprockets 51 are moved or extended outward into the respective planes 52 of the flexible tension chains 40. Further, the platform section 36 is simply swung about hinge axis 37 up on top the platform section 35 (compare solid line position to phantom line position as shown in FIG. 1). Thereafter, the folded platform 10 is simply raised by the fluid motors 27. As the folded platform 10 is upraised, and in light of the compounding relation between the compounding sprockets 51 and the flexible tension members 40, the platform is pivoted upwardly about pivot axis 16 into the vertical full up attitude illustrated in FIG. 7 when the fluid motors 27 top out. In this attitude, and as previously explained, the mast safety bolts 65 are extended into the phantom line position illustrated in FIG. 5 so as to positively hold the folded platform 10 in vertical relation with the opposed mast assemblies 18. And the safety chains 75 connected to mast guides 25 are hooked onto pins 78 on the platform 10. Subsequently the pressure in fluid motors 27 is relieved and this allows the vertical folded platform 10 to drop or relax slightly into the final over-the-road FIG. 8 storage position from the FIG. 7 full up position. As the folded platform drops slightly to the FIG. 8 position, each safety latch's hook 85 is automatically spring 87 biased into latched relation with its associated pin 89 on the platform because the compounding chains 40 have relaxed.

Having described in detail the preferred embodiment of my invention, what I desire to claim and protect by Letters Patent is:

1. A cargo platform assembly comprising
    a mast assembly having a mast guide and a mast movably supported by said guide,
    a motor for moving said mast relative to said mast guide,
    a platform pivotally connected to said mast, said platform being swingable relative to said mast between an open position and a closed position,
    a flexible tension member having one end connected to said platform and the other end connected to said mast, and a compounding wheel rotatably mounted at a stationary position relative to ground, said compounding wheel and said flexible tension member being relatively selectively positionable between a first position where the tension member is engaged by the compounding wheel for swinging the platform between open and closed positions as said mast moves relative to said mast guide and relative to ground, and a second position where the tension member cannot be engaged by the compounding wheel when the mast is moved relative to the mast guide for raising and lowering the platform as an elevator, and
    a safety latch having one portion mounted on said mast and another portion mounted on said cargo platform, one of said two portions of said safety latch being biased against said flexible tension member so that it is latchingly connected with the other of said two portions when said platform is in its closed position and when said tension member is relaxed to prevent swinging movement of said platform toward its open position, and so that when said tension member is taut one of said two portions of said safety latch is disconnected from the other of said two portions of said safety latch to permit swinging movement of said platform toward its open position from its closed position.

2. A cargo platform assembly as set forth in claim 1, said latch comprising
    a sensor continuously biased against said flexible tension member, the tautness of said tension member as determined by said sensor causing said one of said two portions of said safety latch to be connected to or disconnected from the other of said two portions of said safety latch.

3. A cargo platform assembly as set forth in claim 2, said latch comprising
    a hook and a pin, said hook being mounted on one of said mast and said platform, and said pin being mounted on the other of said mast and said platform.

4. A cargo platform assembly as set forth in claim 3, the closed position of said platform being generally vertical relative to ground, and said mast being movable in a generally vertical path relative to ground.

5. A cargo platform assembly as set forth in claim 3, said latch being mounted on said mast, and said pin being mounted on said platform.

6. A cargo platform assembly as set forth in claim 5, said latch comprising
    an arm shaped element, one end of said arm mounting said sensor and the other end of said arm mounting said hook, said arm being pivotally connected at its elbow to said mast, and
    a spring continuously biasing said arm against said flexible tension member.

7. A cargo platform assembly comprising
    a cargo platform,
    a mechanism that operates said platform in elevator fashion when said platform is in a horizontal position, and that operates to move said platform into a storage position from said horizontal position, said mechanism being positionable in a relaxed attitude when said platform is stored that permits said platform to move uncontrollably from said storage position toward said horizontal position if said mechanism is operated while in said relaxed attitude and if no restraint is provided to said platform,
    a safety latch connected to said assembly, said safety latch being automatically connected with said platform in response to movement of said platform into said storage position from said horizontal position so as to maintain said platform in said storage position if said mechanism is positioned in said relaxed attitude, and said safety latch being automatically disconnected from said platform to release said platform from said storage position when said mechanism is positioned in an activated attitude that permits said platform to move controllably from said storage position toward said horizontal position, and
    a sensor connected with said safety latch, said sensor being adapted to sense when said mechanism is positioned in said activated attitude or in said relaxed attitude when said platform is in said storage position, said safety latch being disconnected from said platform in response to sensing of said mechanism in said activated attitude and being connected with said platform in response to sensing of said mechanism in said relaxed attitude.

8. A cargo platform assembly as set forth in claim 7, said latch comprising
    a hook and a pin, said hook being mounted on one of said mechanism and said platform, and said pin being mounted on the other of said mechanism and said platform.

9. A cargo platform assembly as set forth in claim 8, said latch having an arm shaped configuration, one end of said arm mounting said sensor and the other end of said arm mounting a hook, and a bias device continuously biasing said arm into sensing relation with said mechanism.

10. A cargo platform assembly comprising a mechanism for swinging a platform from a generally horizontal elevator position to a generally vertical position, for raising said platform in said vertical position to a full up intermediate storage position, and for lowering said platform in said vertical position slightly relative to said full up position into a final storage position, a safety latch interconnected with said mechanism, said latch being movable between latch and unlatch positions, said latch automatically latching said platform in said final storage position in response to lowering of said platform from said full up storage position to said final storage position to prevent swinging of said platform toward a horizontal position while in said final storage position, and a sensor connected to said safety latch, said sensor being adapted to sense when said mechanism is lowering said platform from said full up storage position into said final storage position and said sensor being adapted to sense when said mechanism is raising said platform from said final storage position to said full up storage position, said safety latch not being connected with said platform as said platform is lowered unless said sensor senses said platform being lowered to said final storage position.

11. A cargo platform assembly as set forth in claim 10, said assembly comprising a safety device selectively connectable with said platform and a support fixed at a location above ground, said connection so formed maintaining said platform above ground in said final storage position.

12. A cargo platform assembly as set forth in claim 11, said latch comprising a hook and a pin, said hook being mounted on one of said mechanism and said platform, and said pin being mounted on the other of said mechanism and said platform.

13. A cargo platform assembly as set forth in claim 12, said latch having an arm shaped configuration, one end of said arm mounting said sensor and the other end of said arm mounting a hook, and a bias device continuously biasing said arm into sensing relation with said mechanism.

* * * * *